219-121. 1-1-74 OR 3,783,228 SR

United States Patent [19]

Tarui et al.

[11] 3,783,228

[45] Jan. 1, 1974

[54] METHOD OF MANUFACTURING INTEGRATED CIRCUITS

[75] Inventors: Yasuo Tarui; Seiichi Denda; Harutsune Baba, all of Tokyo; Yasuo Komimiya, Yokohama, all of Japan

[73] Assignee: Agency of Industrial Science and Technology, Minister of International Trade and Industry, Tokyo, Japan

[22] Filed: Dec. 28, 1970

[21] Appl. No.: 102,026

Related U.S. Application Data

[63] Continuation-in-part of Ser. No. 712,797, March 13, 1968, abandoned.

[30] Foreign Application Priority Data

| | | |
|---|---|---|
| Apr. 13, 1967 | Japan | 42-23128 |
| Apr. 13, 1967 | Japan | 42-23129 |
| Apr. 13, 1967 | Japan | 42-23130 |
| Apr. 19, 1967 | Japan | 42-24564 |
| May 10, 1967 | Japan | 42-29124 |
| June 13, 1967 | Japan | 42-37339 |
| June 16, 1967 | Japan | 42-38144 |
| Aug. 4, 1967 | Japan | 42-49789 |

[52] U.S. Cl. .................... 219/121 EM, 250/49.5 A

[51] Int. Cl. .................... B23k 15/00

[58] Field of Search .............. 219/121 EB, 121 EM, 219/121 R; 318/562; 250/49.5 A

[56] References Cited

UNITED STATES PATENTS

| | | | |
|---|---|---|---|
| 3,308,264 | 3/1967 | Ullery, Jr. | 219/121 EB |
| 3,326,176 | 6/1967 | Sibley | 219/121 EB X |
| 3,513,285 | 5/1970 | Imura | 219/121 EM |
| 3,284,618 | 11/1966 | Gotz et al. | 235/151.11 |

OTHER PUBLICATIONS

"Investigation of P–N Junctions in the Emission Electron Microscope EF–6," by Soa and Thiel, July 3, 1970.

"The Electron Mirror Microscope and its Application for Semiconductor Studies," Electronic Equipment News, Vol. 1, No. 5, Aug. 1970.

*Primary Examiner*—R. F. Staubly
*Assistant Examiner*—Gale R. Peterson
*Attorney*—Holman & Stern

[57] ABSTRACT

In the manufacture of a pattern of an integrated circuit, a reference mark is detected by an electron beam scan to correctly determine the position of the pattern on each semiconductor chip, or to correctly combine the patterns of circuit elements. The reference mark may also be used to locate defects of the semiconductor material so as to avoid defective regions.

4 Claims, 34 Drawing Figures

METHOD OF MANUFACTURING INTEGRATED CIRCUITS

BACKGROUND OF THE INVENTION

This application is a continuation-in-part of application S.N. 712,797, filed March 13, 1968 now abandoned.

This invention relates to the manufacture of integrated circuits and more particularly relates to a new and improved method of providing patterns of an integrated circuit at correct positions.

In a monolithic integrated circuit or a hybrid integrated circuit a number of circuit elements such as transistors, diodes, resistors and capacitors are formed on a place and these circuit elements are suitably interconnected to form the desired circuit.

According to the conventional method of preparing a pattern of an integrated circuit including a number of circuit elements, it is usual to prepare at least five original drawings of greatly magnified scale, reduce the size of the original drawings, and then combine several hundreds of such reduced original drawings to prepare a photo-mask. The photo-mask is used to prepare the desired circuit pattern through the photo-etching technique. With this method, however, it is difficult to provide high resolutions. Moreover, the pattern for a high density integrated circuit is extremely complicated, thus requiring very troublesome and expensive process steps.

As an approach to this problem, a method of scanning with an electron beam has been proposed.

This method can provide patterns of high resolutions. In the method of manufacturing patterns by electron beam scanning, while there are many methods of recording or storing patterns, the method having the highest accuracy is wherein the electron beam is deflected by electric signals generated by a memory device utilizing digital quantities such as an electronic computer, a magnetic tape, a magnetic drum, a paper tape or card. Generally, according to this method, a pattern comprising the circuit or all bits comprising the divided pattern (each bit corresponding to a spot of the electron beam and comprising the minimum portion having a diameter of less than one micron) are stored, or four corners of a rectangular pattern are stored in the memory. These stored informations are displayed, in a two-dimensional system, on a silicon wafer, a substrate, a photo-graphic film, a fluorescent screen, or a screen of a cathode ray tube to form, directly, or through a photo-mask, a pattern on a semiconductor body or a substrate. The above outlined method of preparing a pattern of the integrated circuit is not advantageous, particularly in that the designer is required to draft a number of original drawings.

Another problem involved in the method of preparing a number of identical patterns of the integrated circuit on the surface of a semiconductor wafer by repeated scanning with an electron beam, is the difficulty of correctly determining the relative position of respective patterns.

In the conventional method of preparing the pattern by means of a glass mask and ultraviolet rays it is possible to determine the correct position with an optical microscope. However, the optical microscope cannot be used for the electron beam method. If the electron beam system is used in a manner like that in which a scanning type electron microscope is used, correct positioning can be made by manual adjustment. However, this method is not practical because it requires several hundreds or more manual operations for a single wafer owing to limitations of the mechanical adjustment and impossibility of scanning the beam over a wide area.

Consequently, an improved mehtod of determining the correct position of patterns has been proposed wherein a previously formed pattern or a mask is detected to provide an electric signal and the signal is utilized as a reference to provide the correct positioning by an automatic electric operation. However, signals utilizable as reference signals and derived from a pattern, for example a raised or recessed portion of a $SiO_2$ film (or a mask for diffusion) or a p-n junction, are greatly attenuated by the application of photo-resist on the surface of the wafer. This not only requires an amplifier of high gain but also results in error in the correct position owing to noise.

Further, when using a reference mark of a predetermined configuration, it is necessary to know the correct position thereof. For example, when a raised or recessed portion on a $SiO_2$ film formed on a semiconductor wafer or a p-n junction is used as the reference mark, errors are generally caused by noises or the size of the electron beam spot, thus requiring the use of a high sensitivity amplifier or a complicated waveform shaping circuit. Thus, when a reference mark of a criss-cross configuration is utilized, it is necessary to determine the geometrical center thereof. Yet another problem encountered in the manufacture of semiconductor integrated circuits, particularly of the multi-chip type, is the difficulty of providing inter-connecting wires between chips provided with integrated circuits. It is highly desirable to automatically provide such wirings with an electron beam.

Further, in the manufacture of integrated circuits it is highly desirable to improve the yield of acceptable products. Usually a semiconductor wafer is divided into a large number of chips. However, a monocrystalline semiconductor wafer includes a number of defects caused by surface grinding and polishing, oxidation, epitaxial diffusion, etc. Accordingly, there are a number of defective chips, which should be selected and discarded.

BRIEF SUMMARY OF THE INVENTION

It is therefore the general object of this invention to provide patterns of integrated circuits at correct positions.

Another object of this invention is to simplify the manufacturing steps of such patterns.

Yet another object of this invention is to determine the correct position of the patterns of the integrated circuits by utilizing a reference mark.

A further object of this invention is to determine the geometrical center of a reference mark of a predetermined configuration.

A still further object of this invention is to increase the speed of forming patterns of integrated circuits by utilizing an electron beam.

Another object of this invention is to detect defective semiconductor chips whereby to improve the yield of acceptable products.

Another object of this invention is to provide a novel reference mark as well as a novel method of detecting the same.

According to one aspect of this invention, when preparing a pattern of an integrated circuit comprising a plurality of transistors, resistors and like circuit elements, by storing informations of patterns of typical circuit elements in a memory and by forming the integrated circuit pattern under control of a computer means in response to said stored informations, reference marks are provided on a substrate corresponding to each of said stored patterns of the typical circuit elements, and patterns of such elements are formed on the substrate according to the reference marks.

It is also a feature of this invention to vary the diameter of an electron beam when forming a pattern of an integrated circuit in accordance with predetermined conditions of various portions of the patterns. For example, where the beam is deflected in a manner as in television scanning, the diameter of the beam is varied in proportion to the dimension of the portion of the pattern measured at right angles with respect to scanning lines, whereby the time required for scanning a predetermined area can be reduced.

According to another aspect of this invention, a reference mark of a particular configuration or nature is provided for each chip of a semiconductor wafer, thus assuring correct positioning of the integrated circuit pattern on each chip. Such a reference mark may be a raised portion or a recess, or a substance capable of reflecting the electron beam or emitting secondary electrons. Alternatively, the reference mark may be a semiconductor having a conductivity type opposite to that of the wafer or chip, thus providing a p-n or n-p junction therebetween. When scanned with a beam of electrons, such junctions create a difference in the induced electromotive forces which is detected to provide a signal representing the position of the reference mark.

Where the reference mark has a definite configuration, it is necessary to detect the position of the geometrical center thereof in order to determine more accurately the position of the reference mark and, hence, the position of the integrated circuit pattern to be formed under the control of said reference mark.

According to another aspect of this invention, to determine such a geometrical center of the reference mark, the electron beam is deflected to trace a circular path to produce a signal of a predetermined frequency, and the signal is applied to a tuning circuit to determine the center by the maximum or minimum value of the output from the tuning circuit.

In this invention the electron beam system is utilized in a manner similar to a scanning type electron microscope. Any point on the wafer surface can be observed by detecting secondary electrons emitted by the reference mark or electrons reflected from the reference mark as may be done with a conventional scanning type electron microscope. In this process, a given position on the surface of the wafer exactly corresponds to the voltage or the current applied to the deflection coil of the system.

In the manufacture of an integrated circuit by utilizing an electron beam wherein a wafer is initially exposed to the beam, a reference mark which is to be used as a reference position in the succeeding exposure is made on the wafer. THe position of such a mark can be determined by mechanical means, for example, and the accuracy of such determination may not be very high.

Now, prior to the second exposure of the wafer to the electron beam, a manufacturing process such as chemical etching, epitaxial growth or impurity diffusion is performed on the outside of the electron beam system. Then, at the time of the second exposure, the relative position between the wafer and the deflection system is changed from that at the first exposure. In the second exposure, the location of the mark is detected and is used as the reference point of the position of the pattern of the integrated circuit to be formed by the second exposure.

The mark itself is preferably detected as follows. The scanning electron beam passing over the mark produces secondary electron emission or reflected electrons which are detected by an electron detector placed at a suitable point within the reach of these electrons so as to provide an output in the form of an electric pulse. The electron detector may comprise any well known type detector such as a PN junction or a photoelectric multiplier with an electron-light converter. The position of the reference mark can be determined by measuring the time phase of the pulse generated by the detector, which corresponds to the value of the voltage or the current in the deflection system. Hence the position of the mark relative to a point to be exposed can be accurately reproduced by using an incremental voltage or current value which is based on the value of the voltage or current for the position of the mark. The incremental voltage or current can be accurately produced by converting a digital timing pulse into a sawtooth scanning waveform.

The novel reference marks may also be used to detect defective chips, or to provide connecting wires between chips at correct positions.

DESCRIPTION OF PREFERRED EMBODIMENTS

Figure 1:
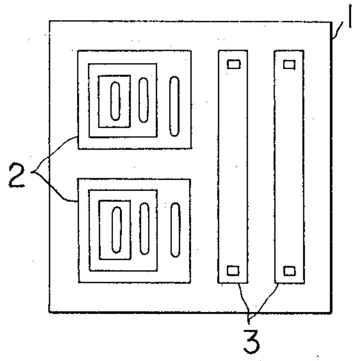
FIG. 1 illustrates a plan view of a typical integrated circuit.
Figure 2:
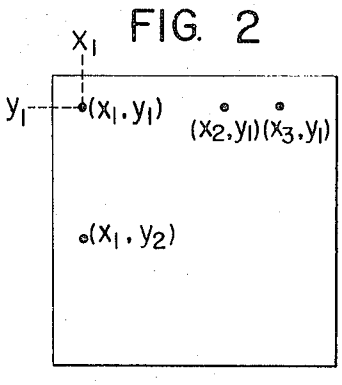
FIG. 2 depicts one example of a method of determining correct positions of circuit elements utilized in the circuit shown in FIG. 1.
Figure 3:
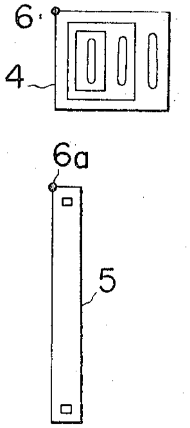
FIG. 3 depicts examples of stored patterns of a transistor element and a resistor element.

Referring now to FIGS. 1, 2 and 3, it is now assumed that it is desired to manufacture an integrated circuit 1 as shown in FIG. 1 by utilizing an electronic memory device. For the sake of simplicity, the integrated circuit shown in FIG. 1 includes only two transistors 2 and two resistors 3. According to this invention a design pattern as shown in FIG. 1 is prepared on a semiconductor wafer or chip, or a substrate. This design pattern includes a number of reference points or marks corresponding to various elements shown in FIG. 2.

More specifically, points or reference marks $(x_1, y_1)$ and $(X_1, y_2)$ correspond to the point of reference 6 having a predetermined positional relationship with respect to the pattern of transistor element 4. This reference point may be any point on the transistor pattern 4 but in this example is illustrated as the left upper corner of pattern 4 and information of the reference point is stored in the computer means together with that of the transistor pattern. Then the first transistor is formed on the surface of the wafer by means of an electron beam scanned in accordance with the stored informations starting from the reference mark $(x_1, y_1)$. Thereafter the second transistor is formed by utilizing the same informations starting from reference mark $(x_1, y_2)$. Detail of the reference mark and method of detection will be described later.

Similarly, two reference points or marks $(x_2, y_1)$ and $(x_3, y_1)$ are provided for the resistor elements as shown in FIG. 2, which are brought to coincide with a point 6*a* at the left upper corner of a resistor pattern 5 shown in FIG. 3. Accordingly, in order to prepare a pattern as shown in FIG. 1, the designer is required to merely determine reference points as shown in FIG. 2, thus greatly simplifying mask manufacturing steps.

It will be clear that this invention can be applied to the preparation of more complicated patterns than those shown in FIGS. 1 and 3. Further, as it is necessary to store only one transistor pattern which can be used repeatedly according to orders, it is possible to greatly reduce the storing capacity of the memory device.

Thus, according to this invention, desired circuit patterns can be readily prepared without drafting complicated patterns by merely storing patterns of standard circuit elements and by repeatedly utilizing stored patterns. Accordingly, this invention is useful for providing extremely complicated integrated circuit patterns, particularly those for high density integrated circuits containing several hundred to several thousand elements thus requiring long periods for drafting them or patterns utilized for perforating $SiO_2$ masks for diffusing elements. Thus, this invention makes it possible to prepare complicated integrated circuit patterns in a short time and at low cost, thus reducing the cost of manufacturing such integrated circuits.

Figure 5:
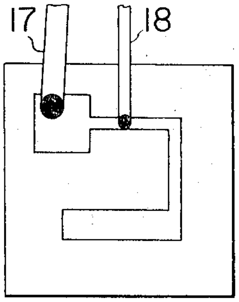
FIG. 5 shows the principle of an improved method.
Figure 6:
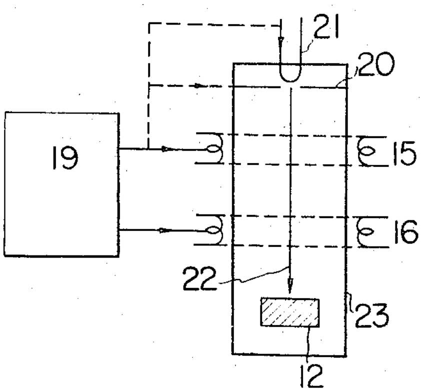
FIG. 6 is a schematic view, partly in block form, of an electron beam generating apparatus for carrying out the improved method depicted in FIG. 5.
Figure 8:
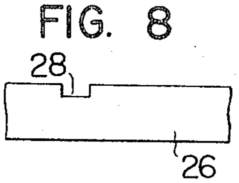
FIG. 8 is a side view of a portion of a wafer illustrating one form of the reference mark.
Figure 9:
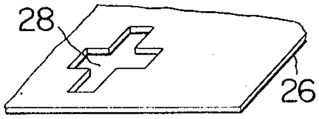
FIG. 9 is a perspective view of the portion shown in FIG. 8.
Figure 10:
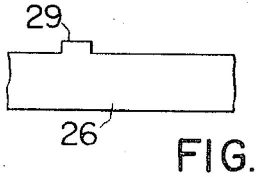
FIG. 10 is a view similar to FIG. 8 but illustrating a modified form of the reference mark.
Figure 11:
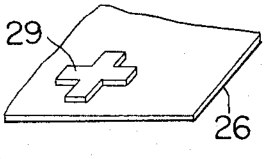
FIG. 11 is a perspective view of the portion shown in FIG. 10.

FIGS. 5 and 6 illustrate an improved method of manufacturing patterns of integrated circuits by means of an electron beam. According to this method the diameter of the electron beam is varied in accordance with a predetermined condition, e.g., the area of the pattern.

Figure 4:
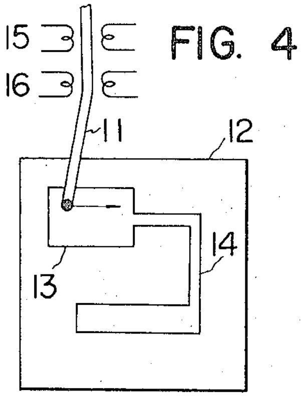
FIG. 4 is a diagram to explain the principle of the conventional method of preparing a pattern of an integrated circuit by means of an electron beam.

According to the conventional method of making a pattern by means of the photoresist exposure technique utilizing an electron beam, a very thin electron beam 11 having a diameter of less than 1 micron is used, and the beam is focused by a focusing electrode 15 and is then scanned across a substrate 12 of an integrated circuit by means of a control electrode or deflection coil 16 according to the principle of television scanning, thereby drafting a desired pattern 13 on substrate 12 as shown in FIG. 4. While digital or analog signals can be used as control signals applied to deflecting coil 16, the diameter of the electron beam is constant. Usually the diameter of the electron beam is made equal to or less than the width a portion 14 of the pattern having the minimum width. In any case, the entire area of the pattern 13 is scanned successively by shifting the fine electron beam, line by line. Therefore, this method of scanning not only requires a long time but also results in uneven exposure (in the form of stripes). In addition, it requires a high capacity memory device. Such a high capacity memory device requires complicated operations and involves possibilities of causing errors in the configuration of the pattern formed.

According to the improved method, however, the diameter of the electron beam is varied as diagrammatically shown by thick and thin electron beams 17 and 18 in FIG. 5 in accordance with the condition of the pattern, in this case the vertical height of various portions thereof or the dimension of the pattern measured at right angles to the direction of scanning lines. To this end, informations regarding the height of various portions of the pattern are stored in a signal generator 19 (FIG. 6), which may be contained in an electronic computer means or a magnetic tape control device, and signals generated by signal generator 19 are utilized to vary the current flowing through focusing coil 15. Reference is made to U.S. Pat. Nos. 3,301,949; 3,326,176, and 3,513,285 for disclosures of typical apparatus. Instead of varying the current through focusing coil 15, the same object may be accomplished by varying the bias potential signal applied to a control grid 20 (FIG. 6) and the current through a filament 21. As is well known in the art, the electron beam 22 is generated in an evacuated vessel 23 and is projected upon a substrate 12 contained therein.

Thus, by increasing the diameter of the electron beam from 1 to 100 microns, for example, the time interval required for scanning can be reduced to approximately 1/100, thereby correspondingly reducing the manufacturing cost of integrated circuits. In addition, the defect of uneven exposure or stripes which have been inevitable in the conventional method of scanning utilizing a fine electron beam of constant diameter can be eliminated. This method also reduces the number of informations to be stored, thereby permitting a decrease in the capacity of the memory device. Simplification of the control also reduces the possibility of defective and erroneous operation.

FIGS. 7 through 13 illustrate another embodiment of this invention wherein a plurality of identical patterns of integrated circuits are formed on the same wafer by means of an electron beam. According to this embodiment, in order to provide identical patterns, a small reference mark in the form of a raised portion or a recess of dimensions of several microns is provided at a predetermined position of each pattern, and such a mark is utilized as the reference point for preparing respective patterns.

Figure 7:
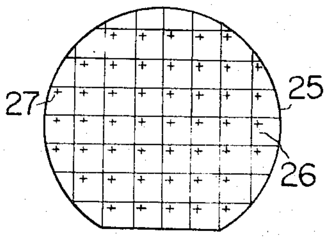
FIG. 7 is a plan view of a semiconductor wafer upon which a plurality of patterns of integrated circuits are to be formed by the electron beam scanning technique.

FIG. 7 shows a plan view of a silicon wafer 25 to be divided into a plurality of chips 26, or integrated circuit units 26. At a predetermined position, for example, at the left upper corner of each chip, there is provided a small reference mark 27 of a predetermined configuration. In the form shown in FIGS. 8 and 9 the reference mark is in the form of a recessed cross, whereas in the form shown in FIGS. 10 and 11 it is a raised cross 29. Recessed reference marks can be prepared by masking and chemical etching techniques, and raised reference marks can be formed by depositing silicon on the surface of the chips by the so-called vapor-liquid-solid method. While the magnitude of the detected signals depends on the dimensions of raised or recessed marks, dimensions of 1 to 10 microns are preferable so that these marks will not interfere with application of the photoresist.

Figure 12:
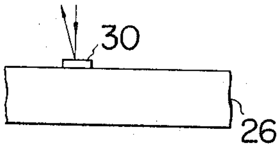
FIGS. 12 and 13 are partial side views of the wafer illustrating another example of the reference mark.
Figure 13:
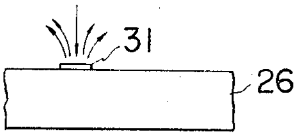

Alternatively, these reference marks may be formed by depositing a film of different material (for example, metal) by vapor deposition or sputtering, as shown at 30 in FIG. 12. It is possible to obtain large signals because such a material manifests quite different properties from those of silicon with respect to reflection and secondary electron emission. However, the metal utilized as the reference marks should not react with silicon, oxidize or diffuse upon heat treatment. Molybdenum, platinum, titanium, etc., are suitable for this purpose. Further, as shown in FIG. 13, the reference mark may be formed by a substance 31 capable of providing a large quantity of secondary electrons when bombarded by an electron beam, such as a phosphorous, selenium, cesium and the like.

Figure 14:
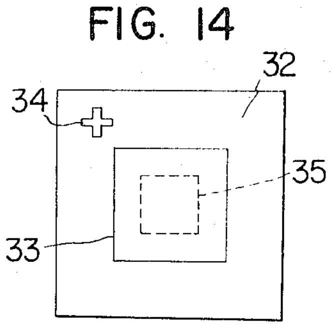
FIG. 14 is a diagram to explain the principle of determining the correct position of the pattern of an integrated circuit.
Figure 15:
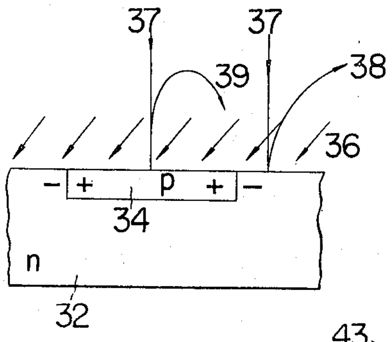
FIG. 15 is a diagram to explain the principle of an improved method of determining the correct position of the pattern of the integrated circuit.

These reference marks precisely determine the position of the pattern of each chip, thus assuring production of identical patterns. Further, as these reference marks do not disappear or vary throughout the entire process steps, correct positioning can be accomplished for respective steps, thus increasing the yield of satisfactory patterns. FIGS. 14 and 15 illustrate another method of correctly positioning the pattern of the integrated circuit.

FIG. 14 is a diagram to show the principle of correctly positioning the pattern by utilizing an electron beam. As shown, a semiconductor chip 32 (a portion of the wafer) or a substrate of an electric insulator is provided with a pattern 33 formed by diffusion or any other suitable method. To provide an additional pattern 35 by the scanning of an electron beam, it is necessary to correctly position it with respect to the first pattern 33, for example at the center thereof. As has been described hereinabove, this can be accomplished by providing a suitable reference mark 34 at a predetermined position of the chip, or by utilizing pattern 33 itself as the reference. Such a reference mark can be formed concurrently with the first pattern by any suitable means such as diffusion of an impurity. The detection of the position of the reference mark is generally made by scanning it with a fine electron beam utilizing conventional equipment such as an electron microscope or beam device, representative disclosures of which being shown in U.S. Pat. No. 3,308,264, or in the literature such as an article entitled "Applications of the Scanning Electron Microscope to Solid-State Devices" by I.M. MacKintosh appearing on pages 370 through 377 of *Proceedings of the IEEE*, Apr., 1965, and by detecting secondary electrons emitted therefrom by utilizing conventional detectors such as a photomultiplier. Following detection, the same electron beam would be utilized to effect working, again in accordance with conventional technology and standard practices as evidenced by the above patent.

Since the detection of such a reference mark is generally effected after applying a photoresist on the wafer, the difference of the intensity of secondary electrons emitted from the p-type region and the n-type region is greatly decreased owing to the absorption and acattering of secondary electrons in the photoresist. This not only causes difficulty in detecting the position signal but also requires an amplifier of high amplification factor.

According to this invention this difficulty can be avoided by utilizing the difference of intensity (or the energy difference) of secondary electrons due to conductivity types. In the embodiment shown in FIG. 15, a reference mark 34 of p-conductivity type is embedded in a chip or wafer 32 of n-conductivity type. When the entire surface of the chip is irradiated with uniform light 36, electrons or holes generated at the p-n junction produce a photo-electromotive force because of the absence of any external circuit. As a consequence a potential difference of from 0.5 to 1 volt can be maintained between the p-type and n-type regions. In other words, the potential of the p-type region is higher than that of the n-type region by 0.5 to 1 volt. With such different potentials at respective regions, upon impingement of an electron beam 37, the path lengths of secondary electrons emitted from respective regions differ greatly as shown at 38 and 39, whereby a large signal voltage can be obtained by means of any known suitable detector as discussed, reference being made, for example, to the detector illustrated on pages 246 through 248 of an article entitled "Wide-Band Detector for Micro-Microampere Low-Energy Electron Circuits" by T.E. Everhart, et al. appearing in *Journal of Scientific Instruments*, Volume 37, July, 1960. Where the chip is of p-type and the mark is of n-type, the same phenomenon can be observed except that the polarity of the potential is reversed. Reference is made to prior art literature for a theoretical analysis of this phenomenon, such as Chapter 17 of a Japanese text by Umejiro Yoshida published by Shokodo in Jan., 1963.

Such signal voltages can be generated by a conventional lamp and a filter located outside the vacuum vessel containing an electron beam scanning apparatus. By interrupting the illuminating light 37 (for example by utilizing an alternating current lamp) a modulated position signal can be derived in the dector. If required, an amplifier of high amplification factor may be used. The light for illumination should have a wavelength not sensed by the photo-resist to guard against premature exposure thereof. Thus, yellow or red light is preferred for use with typical photoresists. Otherwise a yellow or red filter should be employed between the light source and the semiconductor wafer. Although the same effect can be provided by impressing a potential across p-n junctions by mounting electrodes therein, it will be apparent that such a measure is almost impractical because it involves extremely troublesome procedures of mounting numerous electrodes and leads therefor. On the other hand, according to this embodiment, all *p-n* junctions on the surface of the wafer can be uniformly biased so as to thereby enhance the detection of the *p-n* junction reference marks.

FIGS. 16 through 21 illustrate another method of correctly determining the position of the patterns of integrated circuits.

Figure 16:
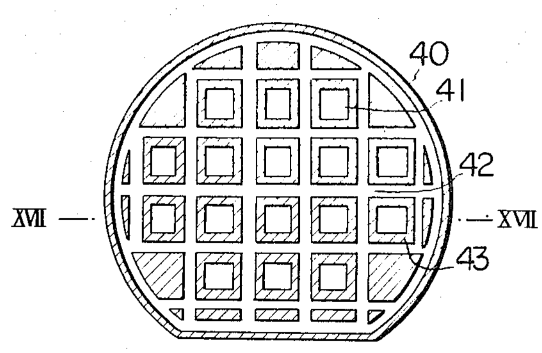
FIG. 16 is a plan view of a wafer on which a plurality of patterns of integrated circuits are to be formed.
Figure 17:
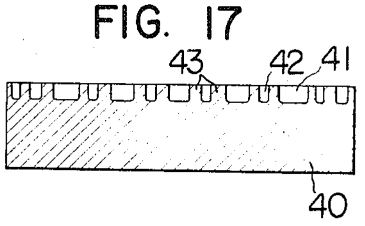
FIG. 17 is a sectional view of the wafer taken along a line XVII—XVII in FIG. 16.

Referring to FIGS. 16 and 17 showing a plan view and a sectional view, respectively, of a semiconductor wafer 40 consisting of a plurality of chips 41, each chip is surrounded by an isolating layer 43. Isolating layers of adjacent chips are separated by a combined signal-transmitting, low-resistance passage and a p-n junction (serving as a detecting or reference mark) 42. Such a pattern consisting of isolating layers and reference marks arranged as shown in FIG. 16 can be prepared on the surface of a semiconductor crystal or a substrate by the photo-etching process or scanning by an electron beam and by removing a film of $SiO_2$ acting as a diffusion mask.

Figure 18:
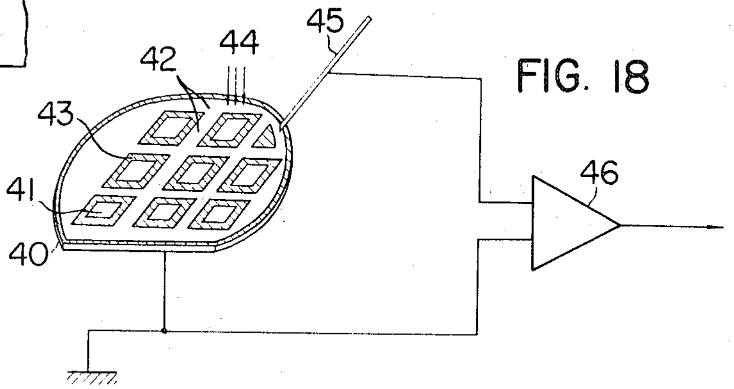
FIGS. 18 and 19 show a method of deriving mark detecting signals from the wafer shown in FIGS. 16 and 17.
Figure 19:
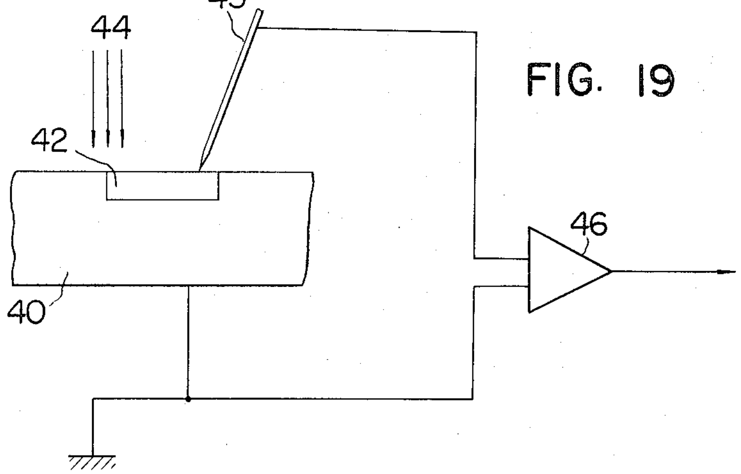
Figure 20:
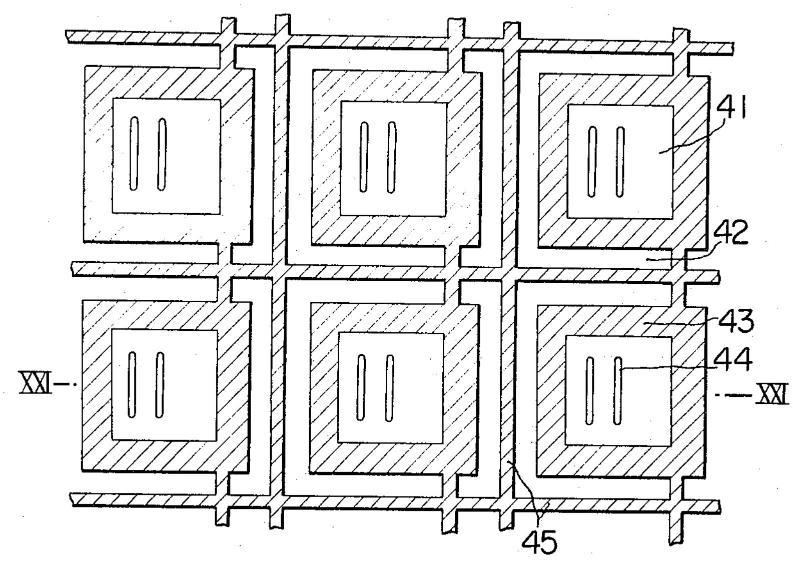
FIG. 20 shows a plan view of a modified wafer formed with additional reference marks.
Figure 21:
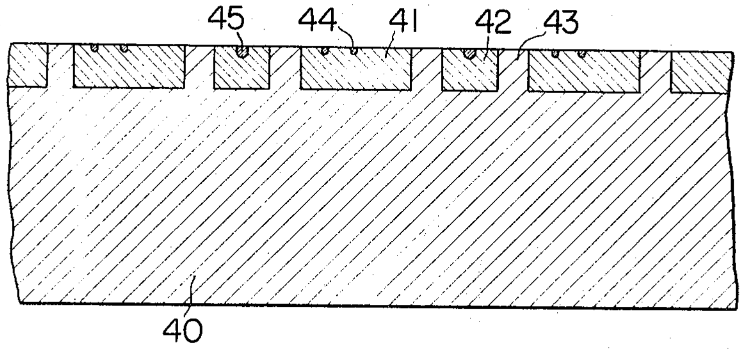
FIG. 21 is a cross-sectional view of the wafer taken along a line XXI—XXI in FIG. 20.
Figure 24:
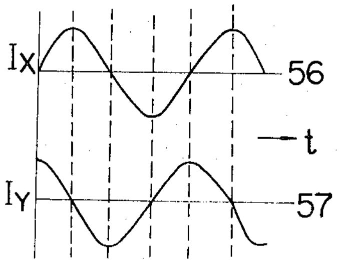
FIG. 24 shows waveforms of currents flowing through deflection coils for effecting circular scanning.
Figure 26:
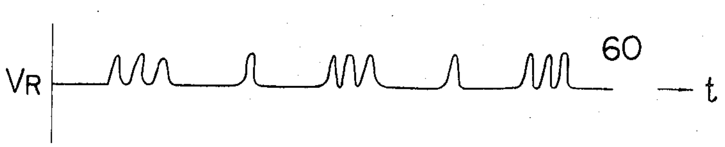
FIG. 26 shows the waveform of the signal when the reference mark is scanned along an eccentric circular path.

FIGS. 18 and 19 illustrate a method of deriving reference mark detecting signals from the structure shown in FIGS. 16 and 17. An ohmic contact 45 connected to a suitable amplifier 46 is provided for a suitable portion of low-resistance passage 42, and the surface of the structure is scanned by an electron beam 44 accelerated by a suitable accelerating voltage. Then, each time the electron beam crosses the p-n junction, a large signal is produced by the electron beam induced current (E B I C) or the electron beam induced voltage (E B I V), so that said signal can be utilized as the position reference signal. By reversely biasing the p-n junction (that is, when the substrate 40 and isolating layer 43 are of p-type and the reference mark 42 is of n-type, substrate 40 and isolating layer 43 are biased negatively, while reference mark is biased positively), larger signals can be detected.

Where there is a possibility of the reference marks becoming ambiguous or disappearing during the process steps of manufacturing integrated circuits, additional marks 45*a* may be formed concurrently with the diffusion of elements 44*a* into chips 41, as shown in FIGS. 20 and 21.

In mounting ohmic contacts, the oxide film on the substrate is locally removed. Further, according to this modification, as it is possible to reversely bias the p-n junctions through the low-resistance passage to create a high potential difference (several tens of volts) across the p-n junctions, it is possible to obtain secondary electron signals having large signal-to-noise ratios.

FIGS. 22 through 28 illustrate still another method of the invention of determining the correct position of the patterns of the integrated circuit.

Figure 23:
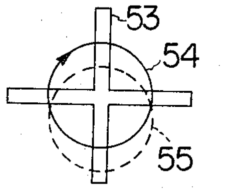
FIG. 23 shows the manner of scanning the reference mark.

In this embodiment, a reference mark 53 in the form of a cross is formed at a predetermined position of a chip 51 on which a pattern of an integrated circuit 52 is to be formed subsequently by means of an electron beam. When determining the correct position, the reference mark is scanned by the electron beam along a circle 54 as shown in FIG. 23. Such a circle can be traced by passing sine-wave currents 56 and 57 having a phase difference of 90° (FIG. 24) respectively through X and Y deflection coils (or electrodes) not shown.

Figure 25:
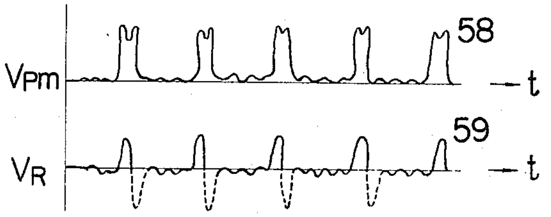
FIG. 25 shows waveforms of the signal generated as the result of scanning.
Figure 27:
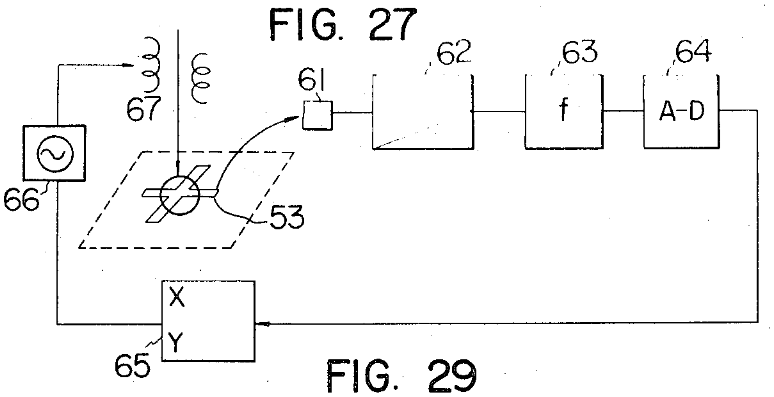
FIG. 27 is a block diagram of a circuit for determining the position of the center of the reference mark.

Each time the electron beam crosses the arm of the mark, a signal is produced. For example, a signal 58 as shown in FIG. 25 can be obtained when an electromotive force across a p-n junction (where the chip and mark are of different conductivity types as above described) is measured, whereas a signal as shown by curve 59 in FIG. 26 can be obtained when reflected electrons are rectified. If the circle 55 representing the locus of the electron beam becomes eccentric with respect to the center of the mark 53, a signal having an irregular waveform as shown at 60 in FIG. 26 will result.

Circular scanning is more advantageous than linear scanning along X znd Y directions which are perpendicular to each other because the latter method of scanning cannot provide such continuous and periodic output.

Signals thus formed are detected by a detector 61 (FIG. 27), amplified by an amplifier 62 and then supplied to a tuning circuit 63 which is set to have a tuning frequency of one-fourth of that generated by the reference mark. The output from the tuning circuit is applied to an A-D converter 64 to provide a digital signal which is supplied to a computer or a data-processing apparatus 65 which checks the output, step by step, in both X and Y directions, to determine and store a reference position (Xo, Yo) at the point of maximum output. It is also possible to modulate by a small amplitude in X and Y directions whereby to shift in X and Y directions according to the detected output until a point of maximum output is reached. A deflection coil 67 is energized by a sine wave generator 66.

Computer 65 also includes a scanning pattern generator, and the reference point (Xo, Yo) provided thereby is utilized as the origin for the next scanning operation. Such a function can be readily provided by a relatively small computer.

Figure 28:
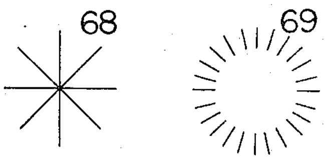
FIG. 28 illustrates modified reference marks.

FIG. 28 illustrates examples of other possible position determining patterns wherein 68 and 69 show radial patterns suitable for circular scanning.

Thus, according to this modification, a reference mark having a plurality of radial arms is used, and the mark is scanned by an electron beam along a substantially circular path to generate a signal of a predetermined frequency. The output signal is amplified and applied to a tuning circuit to provide a maximum point as well as a minimum point of the output to determine the position of the center of the reference mark.

Figure 29:
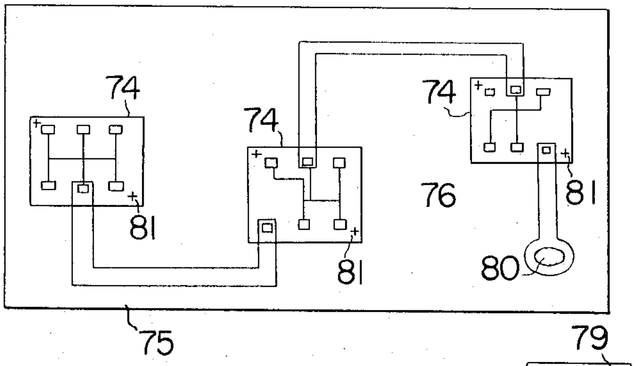
FIG. 29 is a schematic representation of a semiconductor chip assembly to explain an improved method of wiring.
Figure 30:
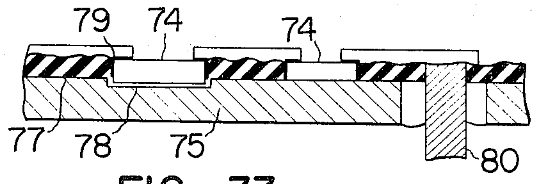
FIG. 30 is a sectional view of the assembly shown in FIG. 29.

FIGS. 29 and 30 illustrate one example of the method of forming a wiring pattern of an integrated circuit on a semi-conductor chip by utilizing a reference mark formed thereon.

Figure 31:
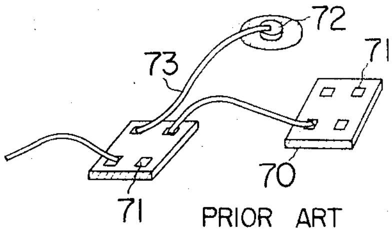
FIG. 31 is a diagram to explain a prior method of wiring of the so-called multi-chip system.

FIG. 31 shows a prior method of forming the pattern. As diagrammatically shown in this figure, according to the prior technique a number of chips 70 are mounted on a board, not shown, and the bonding pads 71 (generally made of aluminum foil) formed on respective chips or the pad and a post 72 (a terminal for attaching an external lead) are interconnected by a wire 73 of gold or aluminum which extends through the air space between adjacent chips. However, this method of wiring is disadvantageous in that a substantial time is required to find the correct position of the pads, in that the mechanical strength of the bonding pads is low, and in that there are formed compounds of poor heat conduction at the joints. For this reason, despite its excellent electrical characteristics, the multi-chip system is not yet satisfactory from the standpoint of reliability and economy.

The novel method of wiring contemplates improvement of the reliability and economy of the multi-chip structure to such an extent that they are comparable to those of the monolithic semiconductor integrated circuit. According to this method, a plurality of semiconductor chips are mounted on a substrate 75 as shown in FIGS. 29 and 30. With any mechanical means the accuracy of positioning chips is not high, and a tolerance of 5 microns or more is unavoidable. With the present-day available method of dividing a wafer into chips such tolerance is even higher. After mounting the chips on the substrate 75, epoxy resin or the like 77 or a low melting point metal or alloy having a coating of an insulator such as SiO is filled in portions 76 between tips to a level substantially equal to that of the chips. If desired, recesses 78 may be provided to receive the chips. This assures intimate contact between the sides 79 of the chips and the filled substance. As shown in FIGS. 29 and 30, the post 80 may be constructed similarly. As described hereinabove, a suitable reference mark or marks 81 are formed at predetermined positions on the surface of each chip. These marks may consist of a film of $SiO_2$ formed during the process steps of preparing the chips, or if desired the corner thereof may be utilized as the reference point.

After securing the chips in this manner, wiring between chips is made in the following manner by means of an electron beam, in which the position of the reference mark is detected by the electron beam, and the signal produced thereby is utilized to correct the position of the wiring.

First, a aluminum film is applied over the entire surface of the assembly shown in FIG. 30, and after drying, the assembly is placed in a vacuum vessel in which an electron beam is generated. As in a scanning type electron microscope, the reference mark on each chip is scanned with a relatively weak electron beam, and the position information thereof is stored in a memory. Similar position information is produced for each chip, and a wiring information is applied to the electron beam device from a computer or by a manual operation in response to said position informations. Then the wiring is made by an electron beam having a strength sufficient to sensitize the photoresist. Thereafter, well known process steps for preparing semiconductor integrated circuits are followed.

Thus, this method can eliminate a number of defects encountered in the multi-chip system and can be applied to large and complicated integrated circuits without utilizing difficult steps including the fine wire bonding method.

Another problem encountered in the manufacture of patterns of integrated circuits by means of an electron beam involves defects (metatheses, surface irregularities, etc.) and contaminations of semiconductor materials. In the production of semiconductor integrated circuits and thin film integrated circuits, the yield or the percentage of acceptable products is one of the important problems which depends upon such defects. The number of defects of monocrystalline semiconductor materials is often as high as $10^2$ to $10^4/cm^3$, so that it is impossible to reduce them to zero. These defects are created not only during the growth of the crystal but also at the time of surface grinding, oxidation, epitaxial diffusion and other like steps. For this reason, the so-called discretionary wiring technique has been proposed for large capacity integrated circuits (L S I).

According to the novel method, an electron beam is utilized to detect precisely the position of such detects or contaminations of the semiconductor material thereby to prepare integrated circuits free from such defects.

Figure 22:
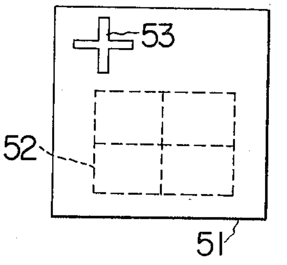
FIG. 22 illustrates the relative position of a reference mark and a semiconductor chip upon which a pattern of an integrated circuit is to be formed.

The semiconductor chip utilized in this example is provided with a suitable reference mark similar to that shown in FIG. 22, and the position of the reference mark is determined by the method described in connection with FIG. 22.

While there are many methods of detecting defects of the material, for example, the methods of utilizing secondary electrons, reflected electrons, absorbed electrons, electromotive force effect induced by an electron beam, cathode luminescence, X-rays and so forth, the selection of an appropriate method depends upon such factors as the ease of deriving signals representing the defects, the signal-to-noise ratio, and the properties of the semiconductor material.

Figure 32:
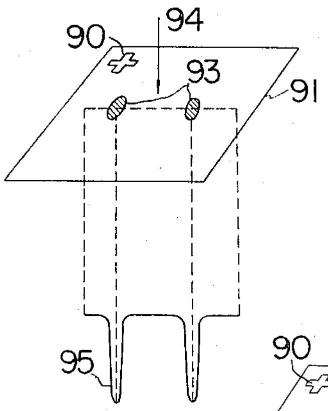
FIGS. 32 and 33 are perspective and side views respectively to explain a method of locating the defects of a semiconductor material.
Figure 33:
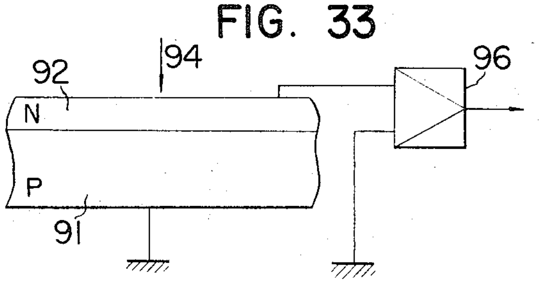

FIGS. 32 and 33 show one example of such defect detecting methods, wherein the substrate comprises a p-type silicon substrate 91 and an epitaxially grown layer 92 (about 10 microns thick), and the defects 93 of the layer 92 are detected by the induced electromotive force effect. Thus the surface of the epitaxially grown layer is scanned with an electron beam 94 which is reduced in the presence of defects 93 to provide a signal indicated by a curve 95. The detected signal is amplified by an amplifier 96. Where the thickness of the epitaxially grown layer is too large with respect to the diffusion length of electrons or holes, electrons or holes may recombine before they can reach the p-n junction, thus weakening the signal produced. However, with the present-day technique wherein a thickness of about 10 microns of the epitaxially grown layer is sufficient for the fabrication of integrated circuits, it is possible to produce signals of sufficient amplitude by the electromotive force effect.

It is also a feature of this method that not only the surface defects but also the internal defects can be detected. It is well known that internal defects cannot be detected by the optical method.

Figure 34:
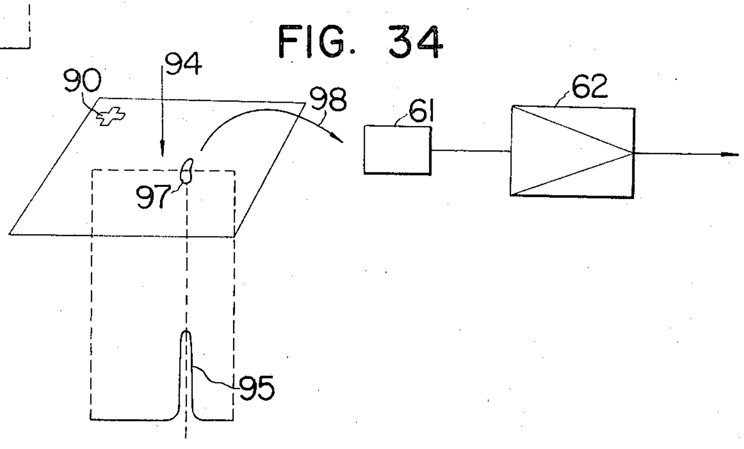
FIG. 34 is a perspective view, partly in the form of a block diagram, to explain an alternative method of locating a contamination by utilizing secondary electrons.

FIG. 34 illustrates a modified method in which a contamination 97 is detected by secondary electrons 98 produced therefrom by the impingement of an electron beam 94. The secondary electrons are treated by a circuit analogous to that shown in FIG. 27 to precisely determine the relative positon of the reference mark and the contamination.

These data and the type or number of the integrated circuits to be prepared may be stored in a computer to provide information to control the electron beam in a manner to provide desired elements.

Thus, this method makes possible the avoiding of defective regions and selecting of only satisfactory regions and thereby improves the yield of acceptable integrating circuits.

It should be understood, of course, that the foregoing disclosure relates to only preferred embodiments of the invention and that it is intended to cover all changes and modifications of the examples of the invention herein chosen for the purpose of the disclosure, which do not constitute departures from the spirit and scope of the invention as set forth in the appended claims.

What we claim is:

1. A method of manufacturing a circuit pattern from a semiconductor wafer, said method comprising the steps of:

storing information in a computer means, the information being representative of a circuit pattern as well as a positional reference point therefor, which positional reference point is to be correlated with the position of a reference mark formed on the semiconductor wafer;

forming a referance mark at a predetermined position on the semiconductor wafer, the reference mark being defined by an isolated p-n junction;

scanning the surface of the semiconductor wafer with an electron beam such that the electron beam scans the p-n junction and the adjacent surface area of the wafer;

detecting the result of the scanning so as to locate the position of the p-n junction on the semiconductor wafer and determine the relative position between the electron beam and the reference mark defined by the p-n junction; and forming the circuit pattern on the semiconductor wafer with the electron beam in accordance with the stored pattern information and the detected position of the reference mark.

2. The method as defined in claim 1, wherein the step of scanning the surface of the semiconductor wafer with an electron beam creates secondary electrons having different path lengths at the p-n junction, and wherein the position of the p-n junction on the semiconductor wafer is determined by detecting the difference in the secondary electron path lengths.

3. The method as defined in claim 2, further including the step of illuminating the reference mark with light prior to the step of scanning the surface of the semiconductor wafer with an electron beam, the illumination generating a photo-electromotive force across the p-n junction enhancing the difference between the path lengths of the secondary electrons at the region of the p-n junction.

4. The method as defined in claim 3, wherein the light is intensity-modulated by means of a sinusoidal wave.

* * * * *